United States Patent [19]
Taxon

[11] 3,803,532
[45] Apr. 9, 1974

[54] ELECTRICAL CONDUIT
[75] Inventor: Fred Nystrom Taxon, Redondo Beach, Calif.
[73] Assignee: Cyprus Mines Corporation, Los Angeles, Calif.
[22] Filed: Mar. 19, 1973
[21] Appl. No.: 342,466

[52] U.S. Cl............... 339/88 R, 174/78, 174/84 S, 285/55, 285/361, 339/96
[51] Int. Cl............................................ H01r 13/54
[58] Field of Search....... 339/88, 96, 188; 174/84 S, 174/78; 285/55, 361, 396, 402

[56] References Cited
UNITED STATES PATENTS
2,673,751   3/1954   Finch................................ 285/361
3,722,923   3/1973   Grahl................................. 285/55

*Primary Examiner*—Joseph H. McGlynn
*Attorney, Agent, or Firm*—Harris, Kern, Wallen & Tinsley

[57] ABSTRACT

A coupling for a pair of electrically conductive tubular conduits, in which the first conduit is upset at one end to receive the end of the second conduit, the upset portion of the first conduit being provided with a bayonet groove to receive a projection adjacent the end of the second conduit.

2 Claims, 8 Drawing Figures

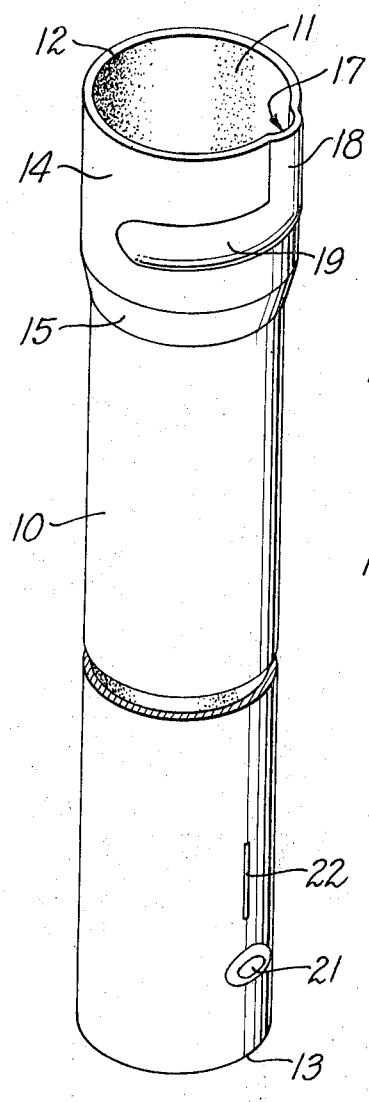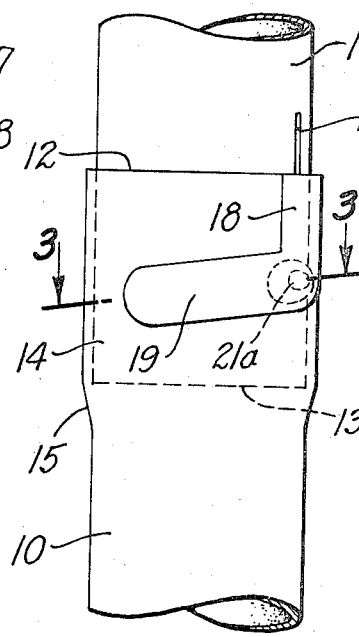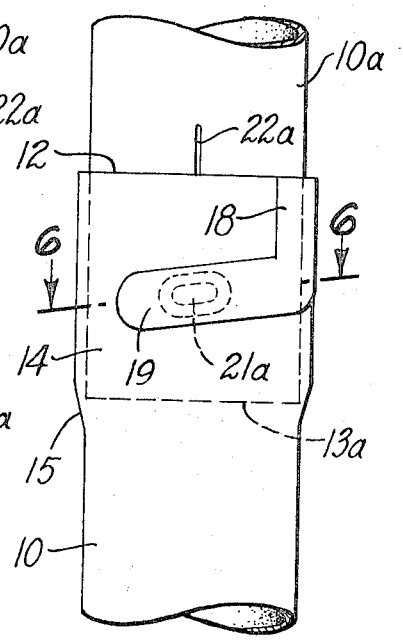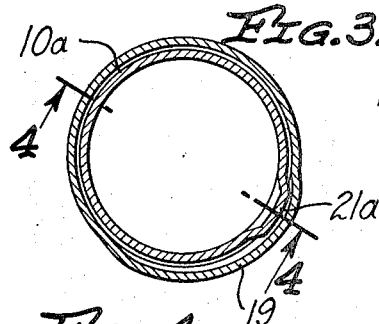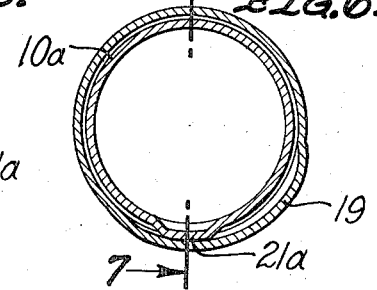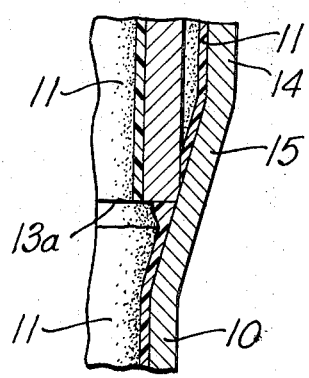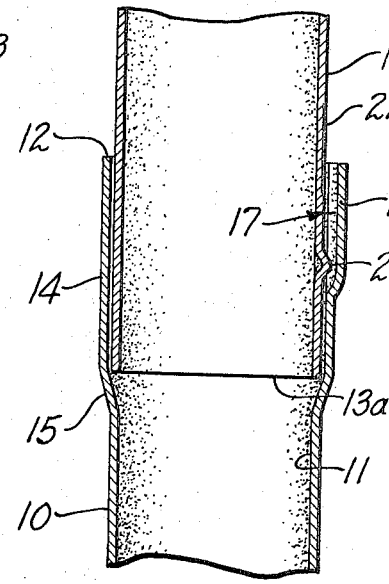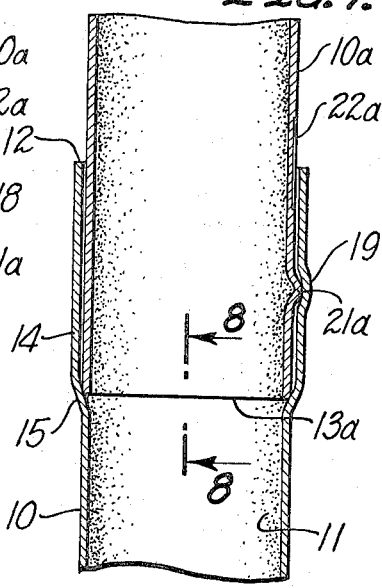

ELECTRICAL CONDUIT

BACKGROUND OF THE INVENTION

It is common in the building industry to use metallic tubular conduit to cover and retain insulated electrical wiring in buildings, the wiring carrying the usual domestic voltages of 110, 220 or 440 volts. Such conduits are normally formed of steel, in sections of 8 or 10 feet in length and are coupled together by separate tubular connectors into which adjacent ends of a pair of sections of the conduit are telescoped, a connector being secured adjacent to the ends of the pair of sections by screws extending through the wall of the coupling and engaging the sections. Such couplings are usually tapped to receive the screws. Thus, the couplings and screws are separate from the conduit and tend to get lost on a construction job, occasioning undesirable delays and loss of labor time. Some building codes and regulations of Underwriters Laboratories, Inc. require a joint of such conduits to withstand a tensile stress of up to 700 pounds without separation of the conduit sections, and it is difficult, particularly for unskilled workmen, on a construction job to determine how tight to set the coupling screws to withstand such prescribed stress. Frequently the screws are set too loose to withstand the prescribed stress, or they are overtightened and broken, occasioning further delays and loss of the workman's time.

Such conduits are commonly required to be internally coated with an enamel for corrosion protection. However, some building codes require that the conduit sections be electrically conductive from section to section through the joint or coupling therebetween with no more than a prescribed voltage drop, such as 10 millivolts with a 30 ampere load, between adjacent sections. Such electrical requirements are difficult to meet on the job with such conventional conduit and couplings described above, as there is no assurance that upon installation there is adequate electrical contact between the conduit sections, screws, and couplings.

THE INVENTION - GENERALLY

It is an object of the present invention to provide a coupling for adjacent tubular metallic electrical conduit sections which is built into the conduit by upsetting one end of each section of conduit so that an end of an adjacent conduit section can be telescoped thereinto, and providing on said ends bayonet slot means by which adjacent sections of conduit may be readily coupled together by unskilled workmen to insure that the coupling will resist longitudinal stresses tending to break the coupling and also to automatically provide an electrical connection between adjacent conduit sections which will have less than a prescribed electric potential drop between sections through the coupling.

Another object of the invention is to provide a coupling which is more rigid and will withstand greater transverse bending forces applied at the coupling than conventional three-piece couplings described above.

THE DRAWING

In the drawing, which is for the purpose of illustration only,

FIG. 1 is a perspective side elevational view of a section of conduit embodying the invention;

FIG. 2 is a side elevational view of one end of the conduit of FIG. 1 inserted into the opposite end of a similar conduit section;

FIG. 3 is a cross-sectional view taken on the line 3—3 of FIG. 2;

FIG. 4 is a longitudinal sectional view taken on the line 4—4 of FIG. 3;

FIG. 5 is a view similar to FIG. 2 but showing one conduit section rotated relative to the other to their relative locking position;

FIG. 6 is a cross-sectional view taken on the line 6—6 of FIG. 5;

FIG. 7 is a longitudinal sectional view taken on the line 7—7 of FIG. 6; and

FIG. 8 is a fragmentary sectional view taken on the line 8—8 of FIG. 7, in exaggerated dimensions.

DETAILED DISCLOSURE OF INVENTION

FIG. 1 of the drawing shows a section of tubular electric conduit 10, formed of an electrically conductive metal, such as steel or aluminum. Conventionally, electric conduit is made in nominal diameters ranging from 1.25 inches to about 4.00 inches, and is internally coated with a thin layer of enamel 11, for corrosion protection, shown in FIG. 8 of a greatly exaggerated thickness for illustration purposes only, the usual thickness of such enamel layer being between 0.001 and 0.002 inches.

The conduit section 10 has ends 12 and 13, the end 12 being provided with an upset cylindrical section 14 connected to the main body of the conduit section by a tapering annulus 15.

Pressed into the upset section 14 is a bayonet groove 17 having a longitudinal portion 18, substantially parallel to the axis of the conduit section 10 and a transverse portion 19, angled downwardly away from the end 12 at about 7°. Although the groove 17 in the preferred embodiment disclosed includes separately oriented portions 18 and 19, it is to be understood that such portions might be made to merge smoothly together, as in a continuous groove, without departing from the spirit of the invention. However, by forming the groove 17 as shown and described, only minimal relative rotation between conduit sections is required, which is a desirable feature of such preferred embodiment.

Adjacent the end 13 of the conduit section 10 is a button 21 pressed outwardly from the conduit and an indicia mark 22 is provided.

A pair of conduit sections, the section 10 and an identical section 10a are assembled by telescoping the end 13a of the section 10a into the upset section 14 of the section 10, the button 21a of the section 10a riding through the portion 18 of the groove 17 to the position shown in FIGS. 2 and 3 in which such button is aligned with the portion 19 of the groove. Relative rotational movement of the conduit sections 10 and 10a causes the button 21a to move in the portion 19 of the groove 17 to the position shown in FIGS. 5, 6, and 7 in which the button wedges securely against the inner wall of the groove portion 19. During such relative rotational movement of the sections 10 and 10a, due to the angle of the groove portion 19, the section 10a is drawn longitudinally into the upset section 14 of the section 10 until the bottom end 13a thereof scrapes through the enamel layer 11 on the interior of the tapering annulus 15 and digs into the metal forming such annulus to provide a good electrical contact between the conduit sections 10 and 10a. The attainment of such final position of assembly is indicated by the fact that the indicia mark 22a on the section 10a has moved substantially past the portion 18 of the groove 17, as shown in FIG. 5. Thus, an unskilled workman to obtain a correct and desired assembly of two conduit sections need only to align them as indicated, push them together to the limit of such relative longitudinal movement, and rotate one relative to the other until the indicia mark 22a is aligned as described, and both he and any building inspector will know that the sections have been assembled as required by the applicable building code or requirements of Underwriters Laboratories, Inc., or both, an important feature of the invention. For example, my invention insures that there will not be greater than a ten millivolt drop in voltage across the coupled conduit sections when exposed to a 30 ampere load thereacross, a common requirement. Also, with my invention the coupling between adjacent conduit sections will withstand a tension of at least 700 pounds tending to pull the sections apart, another common requirement.

In addition, since the coupling of the invention is built into the conduit sections and requires no separate parts, the coupling may be assembled quicker and with less labor than conventional couplings, and with no risk of loss of separate parts required in such conventional couplings.

I claim:

1. In a coupling for electrical conduit, the combination of:

a first tubular conduit section having at one end an upset cylindrical portion of greater internal diameter than the external diameter of the body of such section and connected thereto by a tapered annulus, such cylindrical portion being provided with an internal groove extending from the outer end of such cylindrical portion towards the other end of said first conduit section and decreasing in depth;

a second tubular conduit section of approximately the same external diameter as that of the body of said first conduit section, and having adjacent one end an externally projecting button adapted to fit into said groove of the first conduit section, relative longitudinal and rotational movement of said conduit sections causing said sections to lock together; and said conduit sections being formed of electrically conductive material and said upset cylindrical portion of the first conduit section being internally coated with a layer of enamel for corrosion protection, said relative movement of the sections causing a portion of the second conduit section to pierce through said layer and establish electrical contact therethrough with the first conduit section.

2. In a coupling for electrical conduit, the combination of:

a first tubular conduit section having at one end an upset cylindrical portion of greater internal diameter than the external diameter of the body of such section and connected thereto by a tapered annulus, such cylindrical portion being provided with an internal groove extending from the outer end of such cylindrical portion towards the other end of said first conduit section;

said groove including a first portion generally parallel to the axis of said first conduit section, and a second portion communicating with the inner end of said first portion and extending at an angle thereto to cause said relative movement between said conduit sections to lock the same together;

a second tubular conduit section of approximately the same external diameter as that of the body of said first conduit section, and having adjacent one end an externally projecting button adapted to fit into said groove of the first conduit section, relative longitudinal and rotational movement of said conduit sections causing said sections to lock together; and said conduit sections being formed of electrically conductive material and said upset cylindrical portion of the first conduit section being internally coated with a layer of enamel for corrosion protection, said relative movement of the sections causing a portion of the second conduit section to pierce through said layer and establish electrical contact therethrough with the first conduit section.

* * * * *